May 12, 1925. 1,537,860
T. W. MILLER
APPARATUS FOR MAKING HOLLOW RUBBER ARTICLES, SUCH AS NIPPLES,
FINGER COTS, BULBS, AND THE LIKE
Filed Feb. 28, 1924
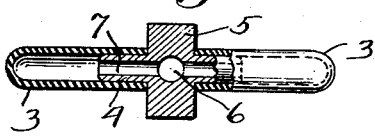
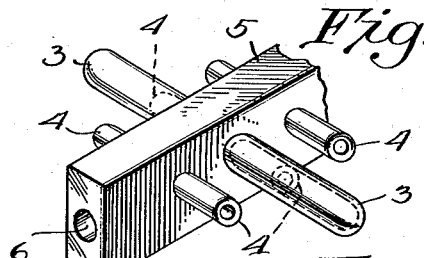
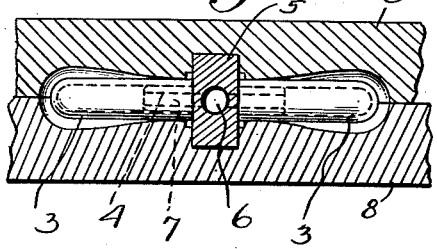
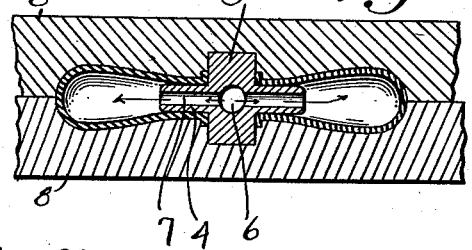
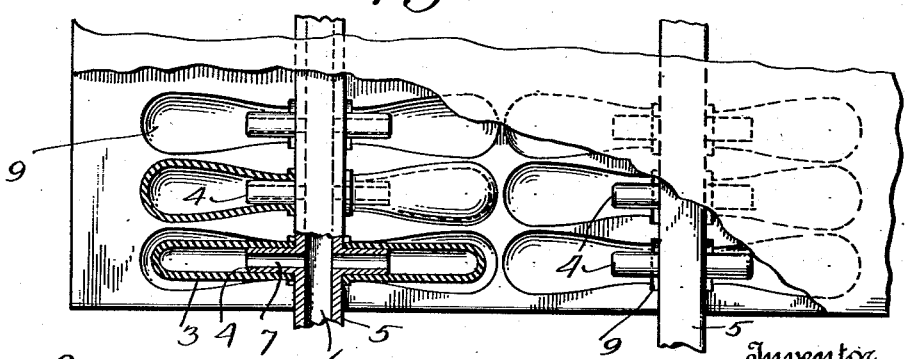
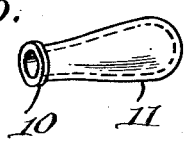
Inventor
Thomas W. Miller
by Percy B. Hills
Attorney Patented May 12, 1925.

1,537,860

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

APPARATUS FOR MAKING HOLLOW RUBBER ARTICLES, SUCH AS NIPPLES, FINGER COTS, BULBS, AND THE LIKE.

Application filed February 28, 1924. Serial No. 695,728.

*To all whom it may concern:*

Be it known that I, THOMAS W. MILLER, a citizen of the United States, residing at Ashland, county of Ashland, State of Ohio, have invented certain new and useful Improvements in Apparatus for Making Hollow Rubber Articles, Such as Nipples, Finger Cots, Bulbs, and the like, of which the following is a specification.

My invention relates to the manufacture of small vulcanized rubber articles closed at one end, such as nipples, finger cots, bulbs, and the like, and is an improvement on the method disclosed in an application filed by me October 31, 1923, Serial No. 671,956, as hereinafter more definitely will be pointed out and claimed, reference being had to the accompanying drawing, in which:—

Figure 1 is a side elevation of a section of unvulcanized rubber tubing as expressed from an ordinary tubing machine.

Figure 2 is a similar view, partly in section, of said tubing section after it has been subjected in part to a rolling and cutting process, the successive steps being shown, whereby said tubing is divided into hollow closed bodies, each substantially the length of one of the articles to be manufactured.

Figure 3 is a transverse sectional view of a vulcanizing mandrel, showing tube sections applied thereon ready for vulcanization.

Figure 4 is a detail perspective view of one end of said mandrel.

Figure 5 is a detail transverse sectional view of my improved mold and mandrel, tube sections being shown thereon in full lines.

Figure 6 is a view similar to Figure 5, taken through the center of opposed tube sections.

Figure 7 is a detail top plan view, partly broken away, of my improved mold sections and mandrel.

Figure 8 is a view of a manufactured article completed.

Similar numerals of reference denote corresponding parts in the several views.

As in my application, No. 671,956, hereinbefore referred to, the first step in carrying out my present method consists in forming, by means of an ordinary tubing machine, a tube 1 of suitable unvulcanized rubber compound of the proper diameter and thickness of wall, said tubing as it is expressed from the tubing machine being first divided into separate sections 2, each of a length sufficient to form two of the completed articles, said sections then being divided by a rolling process, said rolling closing the abutting ends of said sections, said sections then being separated and each forming a body of a size suitable for one of the completed articles, and closed at one end. These sections 3 then are reversed and placed upon lateral projections 4 formed on a mandrel 5, said mandrel being formed with a central aperture 6 extending from end to end, said aperture communicating with similar apertures 7 in each of the stems 4. When all of the stems of this mandrel have been provided with sections 3, the same is placed in a press, the complemental plates 8 of which are shaped suitably to receive the same, and are provided with cavities 9 shaped conjointly to the configuration of the finished articles. The mold being closed and put in a vulcanizing press under pressure and heat, a connection is made with one end of the mandrel 5, and a heating and expanding medium, preferably steam, is admitted thereto, which at once expands the sections 3 to the configuration of the mold sections, as shown in Figure 6. And this interior pressure also will cause the rubber of the sections 3 at the inner ends thereof to expand into the annular grooves 9 formed in the mold sections 8 adjacent the mandrel 5, whereby a bead 10 will be formed on the finished article 11, as best seen in Figure 8.

Having thus fully described the invention, what I claim as new and desire to secure by Letters Patent, is:—

A mold for forming and vulcanizing hollow rubber articles closed at one end, comprising a longitudinally apertured mandrel formed with lateral projections, each adapted to receive thereon the open end of one of the articles to be formed, said projections being apertured to communicate with the aperture in said mandrel and open at their other ends, and complemental mold plates adapted when assembled to enclose said mandrel with the articles thereon disposed in cavities shaped conjointly to the shape of the finished articles.

In testimony whereof, I hereunto affix my signature.

THOMAS W. MILLER.